United States Patent [19]

Rohlf et al.

[11] 4,359,266
[45] Nov. 16, 1982

[54] REAR VIEW MIRROR ASSEMBLY FOR COLLAPSIBLE STROLLER

[75] Inventors: Donna Rohlf, 60 W. 68 St., New York, N.Y. 10023; Ruben M. Lopez, Brooklyn, N.Y.

[73] Assignee: Donna Rohlf, New York, N.Y.

[21] Appl. No.: 223,432

[22] Filed: Jan. 8, 1981

[51] Int. Cl.³ .......................... B62B 9/12; G02B 5/08
[52] U.S. Cl. ................................... 350/307; 280/647
[58] Field of Search ...................... 350/307, 293, 288; 248/479, 487, 476, 475 R; 280/647, 649, 650, 642, 644

[56] References Cited

U.S. PATENT DOCUMENTS

| | | | |
|---|---|---|---|
| 564,454 | 7/1896 | Ryan | 350/307 |
| 638,100 | 11/1899 | Courtney . | |
| 1,345,157 | 6/1920 | Francisco | 248/479 |
| 1,750,947 | 3/1930 | Vons | 350/293 |
| 2,054,967 | 9/1936 | Dahl . | |
| 2,442,620 | 6/1948 | Simpson . | |
| 2,488,450 | 11/1949 | Underwood . | |
| 2,910,915 | 11/1959 | Harris | 350/288 |
| 3,448,558 | 6/1969 | Herr et al. | 350/288 |
| 4,062,555 | 12/1977 | Peng et al. . | |
| 4,065,177 | 12/1977 | Hyde et al. . | |
| 4,072,318 | 2/1978 | Laune . | |
| 4,116,465 | 9/1978 | Maclaren . | |

*Primary Examiner*—Jon W. Henry
*Attorney, Agent, or Firm*—James & Franklin

[57] ABSTRACT

A rear view mirror assembly for use in combination with a collapsible infant stroller of the type having an extendable handle part. The assembly includes an adjustable bracket for engaging the handle part, a mirror, and a position-adjustable member for connecting the mirror to the bracket. The mirror is movable between a first position, wherein the mirror is located in view of the infant occupant, when the stroller is in use, and a second position, wherein the mirror is adjacent the stroller, when the stroller is collapsed. A cushion surrounds the periphery of the mirror to protect the infant from injury.

6 Claims, 4 Drawing Figures

REAR VIEW MIRROR ASSEMBLY FOR COLLAPSIBLE STROLLER

The present invention relates to a rear view mirror and, more particularly, to an adjustable rear view mirror assembly adapted for use in combination with a collapsible infant stroller or the like.

Collapsible infant strollers, particularly of the "umbrella" type, are known in a variety of forms and used widely in this and other countries for transporting infants and small children. Such strollers normally comprise a support or seat upon which the infant sits or reclines. The support or seat is made of canvas, plastic, foam, or the like, and is fastened to a collapsible metal tubular frame at a number of different locations.

When not in use, the frame collapses into a relatively small, light-weight unit which is easily carried or stored. Often, the stroller is provided with umbrella-type handles which extend from the seat portion thereof such that the collapsed stroller can be conveniently carried over an arm, in umbrella-type fashion.

Since the support or seat is permanently fastened to the frame, the infant can be positioned in the stroller only in a single position, that is, facing forward. However, because the handles extend upwardly and rearwardly from the seat portion, the person wheeling the stroller must stand behind same. Therefore, when properly positioned in the stroller, it is not possible for the infant to maintain visual contact with the person pushing the stroller.

It has been theorized by experts interested in infant and early childhood behavior that, in the early stages of infancy, it is detrimental to an infant's emotional well-being to be out of visual contact with the individuals to whom it relates. It is believed that feelings of insecurity may develop due to the loss of visual contact by the infant with those individuals with whom the infant is familiar. Since, when properly positioned in the stroller, an infant is necessarily out of visual contact with the person pushing the stroller, it has been suggested that these type of strollers not be used with infants.

Because of the advantages of the collapsible strollers, from the parents' point of view, same are currently widely used, and most likely will continue to be used, even with very young infants, in spite of the possible adverse psychological effects suggested above. While it may well be possible to design a collapsible stroller in such a manner that the infant would face rearward and, thus, remain in visual contact with the individual pushing the stroller, this is not a practical solution to the problem. Such a stroller would be fine for early infancy. However, as the child gets older, and the loss of visual contact with the familiar individual is no longer detrimental, the child wishes to face forward to see where the stroller is heading. Thus, two different strollers would be required—one for early infancy, with the child facing the rear, and a second for the older child, with the seat facing front. In the great majority of cases, this is not a practical solution because of the economics involved.

It is, therefore, a prime object of the present invention to provide a relatively simple and inexpensive means by which a conventional collapsible stroller could be modified such that an infant properly seated therein could maintain visual contact with the familiar individual pushing the stroller.

It is a further object of the present invention to provide a rear view mirror assembly usable in conjunction with a collapsible stroller which is designed to collapse along with the stroller, thereby not substantially increasing the size or weight of the stroller, or reducing the portability thereof.

It is a further object of the present invention to provide a rear view mirror assembly for use in conjunction with a collapsible infant stroller or the like, wherein the mirror is cushioned so as to prevent injury to the infant, should the infant come in contact therewith.

It is a further object of the present invention to provide a rear view mirror assembly for use with a collapsible infant stroller which can be utilized with a great number of different stroller structures, and is adjustable to accommodate infants of various sizes.

It is still another object of the present invention to provide a rear view mirror assembly for use with a collapsible infant stroller or the like which is composed of relatively simple, inexpensive parts which interact reliably to provide a long, useful life with a minimum of maintenance.

In accordance with the present invention, a rear view mirror assembly is provided for use in combination with a collapsible infant stroller or the like of the type having a frame. The assembly comprises bracket means for engaging the frame. A mirror is provided, as is means for operably position-adjustably mounting the mirror on the bracket means. The mounting means is movable between a first position, wherein the mirror is located in view of the infant occupant, when the stroller is in use, and a second position, wherein the mirror is adjacent the frame, when the stroller is collapsed.

The bracket means comprises first and second parts and means for adjusting the distance between the parts so as to clamp the frame therebetween. The mounting means comprises an elongated member and means for movably connecting one end of the member to one of the parts of the bracket.

The mirror comprises means for movably mounting the mirror to the other end of the elongated member. The mirror also comprises a cushion or the like made of resilient material which surrounds the periphery of the mirror and covers the back of the mirror so as to protect the infant from injury.

To these and such other objects which may hereinafter appear, the present invention relates to a rear view mirror assembly for use with a collapsible infant stroller or the like, as described in detail in the following specification, and recited in the annexed claims, taken together with the accompanying drawings, wherein like numerals refer to like parts, and in which:

Figure 1:
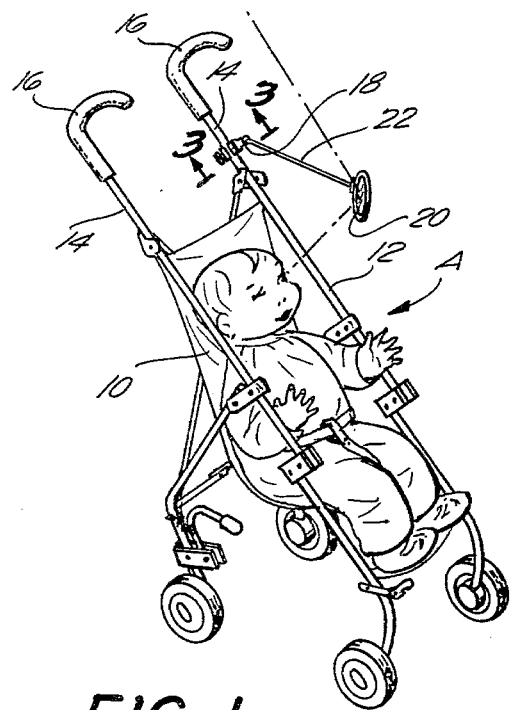
FIG. 1 is an isometric view of a typical collapsible infant stroller showing same in the uncollapsed position with an infant situated therein, and showing the mirror assembly of the present invention in its operative position.

FIG. 1 illustrates a typical collapsible infant stroller of the "umbrella" type currently widely in use. It is for this general type of stroller which the present invention has been designed. However, the rear view mirror assembly of the present invention may be used in conjunction with a wide variety of different infant transport vehicles of varying structures, such as carriers, carriages, or the like, in addition to many different types of strollers. Thus, the particular structure of the stroller or carriage, with which the rear view mirror assembly of the present invention is used, does not form a portion of the present invention and should not be considered as a limitation thereto.

As seen in FIG. 1, the stroller comprises a body portion, generally designated A, which includes a seat 10, normally made of flexible material, which is connected, at various locations, to a collapsible metal tube frame 12. Forming a part of the frame 12 and extending upwardly and rearwardly from the seat portion of the stroller are a pair of handle members 14 which preferably have umbrella-type handle grips 16 at the ends thereof. As is plain from the illustration, an infant properly seated within seat 10 of the stroller faces forward and, therefore, is not in visual contact with the individual positioned behind the stroller to push same.

In order to provide visual contact between the infant and the individual pushing the stroller, the rear view mirror assembly of the present invention is attached to one of the handle parts 14 of frame 12. The assembly comprises bracket means 18 designed to clamp handle part 14, a mirror 20, and a mounting member 22. Mirror 20 is movably connected to mounting member 22 which, in turn, is movably connected to bracket member 18. In this manner, mirror 20 can be positioned in a variety of different locations, forward of handle part 14, to accommodate infants of a variety of different sizes.

Figure 2:
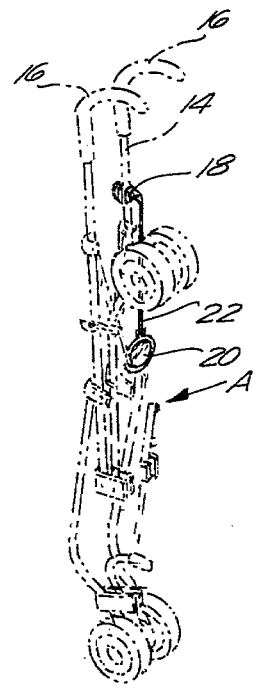
FIG. 2 is an isometric view of the stroller shown in FIG. 1, shown in the collapsed position, with the mirror assembly of the present invention shown in the collapsed position.

FIG. 2 illustrates the stroller in the collapsed position. In this position, mirror 20 is situated adjacent to frame 12 of the stroller, with mounting means 22 parallel to the frame. This is possible because of the movable connections between the mirror 20 and mounting member 22 and between mounting member 22 and bracket means 18. As can be readily appreciated from FIG. 2, in the collapsed position, the mirror assembly of the present invention requires virtually no additional space. Moreover, the assembly weighs little and, thus, adds little additional weight to the stroller.

Figure 3:
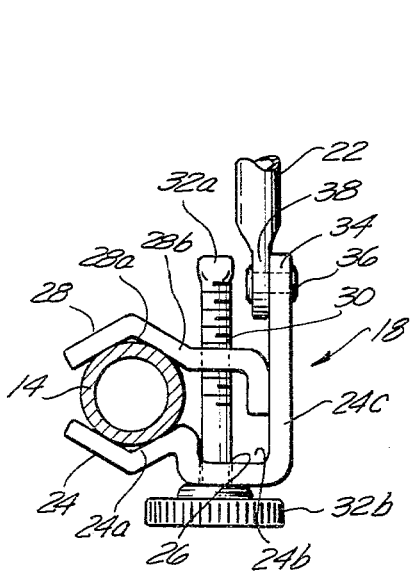
FIG. 3 is a bottom view of the bracket means which forms the portion of the mirror assembly of the present invention, as seen along lines 3—3 of FIG. 1.

The bracket portion 18 of the mirror assembly of the present invention is best seen in FIG. 3. The bracket comprises a first part 24, formed of plastic or metal, having a "V"-shaped portion 24a to accommodate the cylindrical shape of tubular handle member 14. Part 24 also has a planar portion 24b with a non-threaded aperture 26 therethrough.

The second part 28 of bracket 18 is also provided with a "V"-shaped portion 28a, designed to accommodate the cylindrical shape of tubular member 14, and a planar portion 28b with an aperture 30 therein. Portions 24a and 28a oppose each other so as to securely clamp member 14 therebetween.

Aperture 30 is provided with internal screw threads adapted to mesh with the external screw threads of an adjusting screw 32. Adjusting screw 32 comprises a shaft-like part 32a, which is externally threaded to mate with the internal threads of aperture 30, and a head portion 32b, situated on the opposite side of part 24 from part 28. As will now be readily appreciated, rotating head portion 32b of adjusting screw 32 moves parts 24 and 28 toward each other so as to firmly clamp tubular handle member 14 therebetween.

Part 24 has a portion 24c which extends at substantially right angles to portion 24b and has an aperture 34 at the end thereof. One end of mounting member 22 is movably connected to portion 24c of member 24 by means of a pin 36 which extends through an aperture 38 therein. In this manner, member 22 is rotatably mounted to bracket 18.

Figure 4:
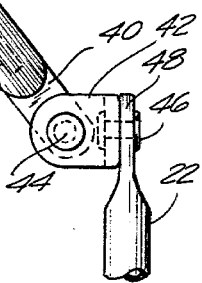
FIG. 4 is a side plan view, having a cut-away section, showing the mirror, cushion and a portion of the mounting member of the present invention.

The structure of the mirror 20 is best appreciated from FIG. 4. Mirror 20 is mounted to member 22 by means of a bracket 40 which is rotatably connected to bracket 42 by means of pin 44. Bracket 42 is, in turn, rotatably connected to the end of member 22 by means of pin 46 which is received within aperture 48. Through this connection system, the mirror 20 may be placed in any one of a large number of different positions.

Mirror 20 itself is situated within a cushion 48 made of soft plastic or the like. Cushion 48 surrounds the outer periphery of mirror 20 and also covers the back of the mirror. Cushion 48 serves to prevent the infant from injuring himself should he come in contact with the mirror.

It will now be appreciated that the present invention relates to a rear view mirror assembly designed for use in conjunction with a collapsible infant stroller or the like. The rearview mirror serves to eliminate the adverse psychological effects resulting from the infant's loss of visual contact with the individual pushing the stroller by permitting the infant to view the individual pushing the stroller while the infant is properly positioned facing the front in the stroller. When the stroller is not in use, and is collapsed for storage or transport, the mirror also collapses and, therefore, adds only minimal volume to the collapsed stroller.

In addition, the rear view mirror assembly of the present invention can be used in conjunction with a wide variety of different stroller and carriage structures. The assembly is relatively inexpensive to manufacture and the mirror is fashioned with a soft plastic cushion surrounding same so as to protect the infant from injury.

While only a single preferred embodiment of the present invention has been disclosed herein for purposes of illustration, it is obvious that many modifications and variations could be made thereto. It is intended to cover all of the variations and modifications which fall within the scope of the present invention, as defined by the following claims.

We claim:

1. A collapsible stroller having a frame member and a rear view mirror assembly, said assembly comprising: bracket means for engaging said frame member; a mirror; and means for adjustably mounting said mirror to said bracket means for movement between a first position, wherein the mirror is located in view of the infant occupant, when the stroller is in use, and a second position, wherein said mirror is adjacent said frame member when the stroller is collapsed.

2. The assembly of claim 1, wherein said bracket means comprises first and second parts and means for adjusting the distance between said parts so as to clamp said frame member therebetween.

3. The assembly of claim 2, wherein said mounting means comprises an elongated member and means for movably connecting one end of said elongated member to one of said first and second parts.

4. The assembly of claim 3, wherein said mirror comprises means for movably connecting said mirror to said other end of said elongated member.

5. The assembly of claim 1, wherein said mirror comprises a cushion, said cushion surrounding the periphery of said mirror.

6. The assembly of claim 5, wherein said cushion covers the back of said mirror.

* * * * *